(12) United States Patent
Terada

(10) Patent No.: US 11,567,712 B2
(45) Date of Patent: Jan. 31, 2023

(54) IMAGE FORMING APPARATUS AND PROGRAM

(71) Applicant: Toshiba Tec Kabushiki Kaisha, Tokyo (JP)

(72) Inventor: Tomoki Terada, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/540,064

(22) Filed: Dec. 1, 2021

(65) Prior Publication Data

US 2022/0269449 A1 Aug. 25, 2022

(30) Foreign Application Priority Data

Feb. 19, 2021 (JP) .............. JP2021-025279

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |

(52) U.S. Cl.
CPC .......... *G06F 3/1211* (2013.01); *G06F 3/1229* (2013.01); *G06F 3/1286* (2013.01); *H04N 1/00896* (2013.01); *H04N 1/00904* (2013.01); *H04N 2201/0094* (2013.01)

(58) Field of Classification Search
CPC .... G06F 3/1211; G06F 3/1229; G06F 3/1286; H04N 1/00896; H04N 1/00904; H04N 2201/0094
USPC ................. 358/1.15, 1.14, 1.13, 1.1
See application file for complete search history.

(56) References Cited

U.S. PATENT DOCUMENTS

| | | |
|---|---|---|
| 8,738,938 B2 | 5/2014 | Yokomizo |
| 9,081,524 B2 | 7/2015 | Yamada et al. |
| 9,519,446 B2 | 12/2016 | Nakayama |
| 2008/0002232 A1 | 1/2008 | Mori |
| 2012/0162690 A1* | 6/2012 | Ishiguro ............. H04N 1/00408 358/1.14 |
| 2012/0236324 A1 | 9/2012 | Muraishi |

(Continued)

OTHER PUBLICATIONS

Extended European Search Report dated Jul. 21, 2022 issued in EP Application No. 22153902.6, 10 pages.

*Primary Examiner* — Douglas Q Tran
(74) *Attorney, Agent, or Firm* — Foley & Lardner LLP

(57) ABSTRACT

An image forming apparatus includes a first control circuit, a second control circuit, and a third control circuit. The first control circuit communicates with an information processing device. The second control circuit is configured to communicate with the first control circuit. The third control circuit is configured to communicate with the second control circuit and control a printer. The first control circuit is configured to receive print information from the information processing device during a power-saving mode and control the start of the second control circuit based on the print information. The second control circuit is configured to control a power supply to the third control circuit based on the start by the first control circuit and transmit, to the third control circuit, a warm-up start instruction for the printer based on the print information acquired from the first control circuit after communication with the third control circuit becomes possible.

17 Claims, 9 Drawing Sheets

(56) References Cited

U.S. PATENT DOCUMENTS

| | | |
|---|---|---|
| 2014/0072323 A1 | 3/2014 | Yamamizu |
| 2016/0167417 A1 | 6/2016 | Sasaki |
| 2018/0017914 A1 | 1/2018 | Hikichi |
| 2018/0067445 A1* | 3/2018 | Ishikawa ................. G03G 15/80 |
| 2018/0203392 A1* | 7/2018 | Yamamoto ............ G06F 3/1215 |

* cited by examiner

| COMBINATION (COLOR MODE/MEDIA TYPE/PRINTING MODE) | INDEX VALUE |
|---|---|
| COLOR PRINT/PLAIN PAPER/NON-DECOLORABLE PRINT | 1 |
| COLOR PRINT/OTHERS/NON-DECOLORABLE PRINT | 2 |
| MONOCHROMIC PRINT/PLAIN PAPER/NON-DECOLORABLE PRINT | 3 |
| MONOCHROMIC PRINT/OTHERS/NON-DECOLORABLE PRINT | 4 |
| PLAIN PAPER/DECOLORABLE PRINT | 5 |
| OTHERS/DECOLORABLE PRINT | 6 |

IMAGE FORMING APPARATUS AND PROGRAM

CROSS-REFERENCE TO RELATED APPLICATION

This application is based upon and claims the benefit of priority from Japanese Patent Application No. 2021-025279, filed on Feb. 19, 2021, the entire contents of which are incorporated herein by reference.

FIELD

Embodiments described herein relate to an image forming apparatus and a program.

BACKGROUND

When an image forming apparatus is in a power-saving mode (S3 state in the Advanced Configuration and Power Interface (ACPI) standard), the image forming apparatus cuts off the power supply to the printer unit or the like. The image forming apparatus mainly supplies power to a part of the main central processing unit (CPU), the main memory, and the Network Interface Card (NIC) to maintain the functions related to the network of the image forming apparatus.

In the related art, when the image forming apparatus receives a NW packet during the power-saving mode, the NIC determines whether or not the packet requires restoration processing of the image forming apparatus. When the NIC determines that the packet requires restoration of the image forming apparatus, the image forming apparatus resumes the power supply to the entire system board and communicates with the client. When the client requests printing to the image forming apparatus by communication and the image forming apparatus receives the print data, the image forming apparatus resumes the power supply to the printer unit. The image forming apparatus enters the print-ready state based on the initialization of the printer unit and the completion of the warm-up operation and then performs the printing process based on the data received from the client.

The Energy Star, which is an international energy conservation system for office equipment, and the Blue Angel Mark, which is a German environmental label, set standards for the time required to complete the NW printing process from the power-saving mode. In order to obtain the certification, the print return time is shortened by various methods.

DETAILED DESCRIPTION

In general, according to one embodiment, there is provided a technique for shortening the time required to return from a power-saving mode to a printable state.

In one embodiment, an image forming apparatus includes a first control circuit, a second control circuit, and a third control circuit. The first control circuit communicates with an information processing device. The second control circuit communicates with the first control circuit. The third control circuit is a control circuit that communicates with the second control circuit and controls a printer unit. The first control circuit receives print information from the information processing device during a power-saving mode and controls the start of the second control circuit based on the print information. The second control circuit controls the power supply to the third control circuit based on the start by the first control circuit, and transmits a warm-up start instruction for the printer unit to the third control circuit based on the print information acquired from the first control circuit after communication with the third control circuit becomes possible.

Figure 1:
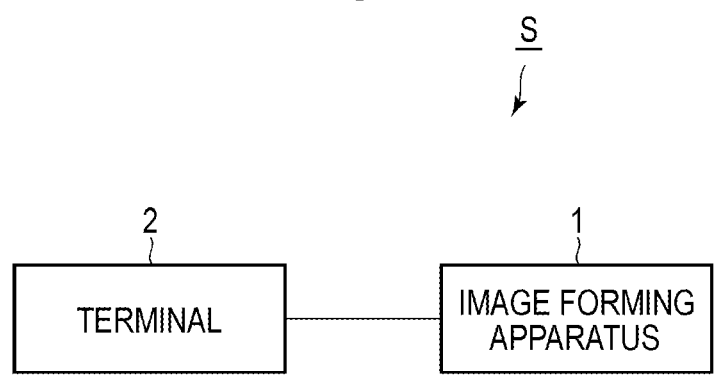
FIG. 1 is a block diagram illustrating an information processing system.

Hereinafter, an embodiment will be described with reference to the drawings. FIG. 1 is a block diagram illustrating an information processing system S. The information processing system S includes an image forming apparatus 1 and a terminal 2. The image forming apparatus 1 and the terminal 2 are connected to freely communicate to each other by wire or wirelessly via a network. For example, the network is, but is not limited to, a local area network (LAN).

The image forming apparatus 1 is a device having an electrophotographic printing function. The image forming apparatus 1 will be described as being a digital multifunction peripheral (MFP) having a copy function, a print function, a facsimile function, a scanner function, and the like. The image forming apparatus 1 can perform non-decolorable printing and decolorable printing.

Non-decolorable printing is suitable for creating documents to be saved. Non-decolorable toner is used for non-decolorable printing. The non-decolorable toner is also called a permanent toner, a normal toner, or the like.

Decolorable printing is printing for creating a document that can "erase" printed characters and the like. Decolorable toner is used for decolorable printing. The decolorable toner is a toner that decolorizes by an external stimulus such as temperature, light with a specific wavelength, or pressure. In the present embodiment, the decolorable toner is assumed to be a toner that decolorizes when the heat of a certain temperature or higher is applied. In the present embodiment, "decoloring" means making an image such as characters formed in a color different from the base color of the sheet visually invisible. Here, the color includes not only a chromatic color but also an achromatic color such as white and black.

The terminal 2 is a device capable of information processing. For example, the terminal 2 is, but is not limited to, a personal computer (PC), a tablet terminal, a smartphone, or the like. The terminal 2 is an example of an information processing device.

Figure 2:
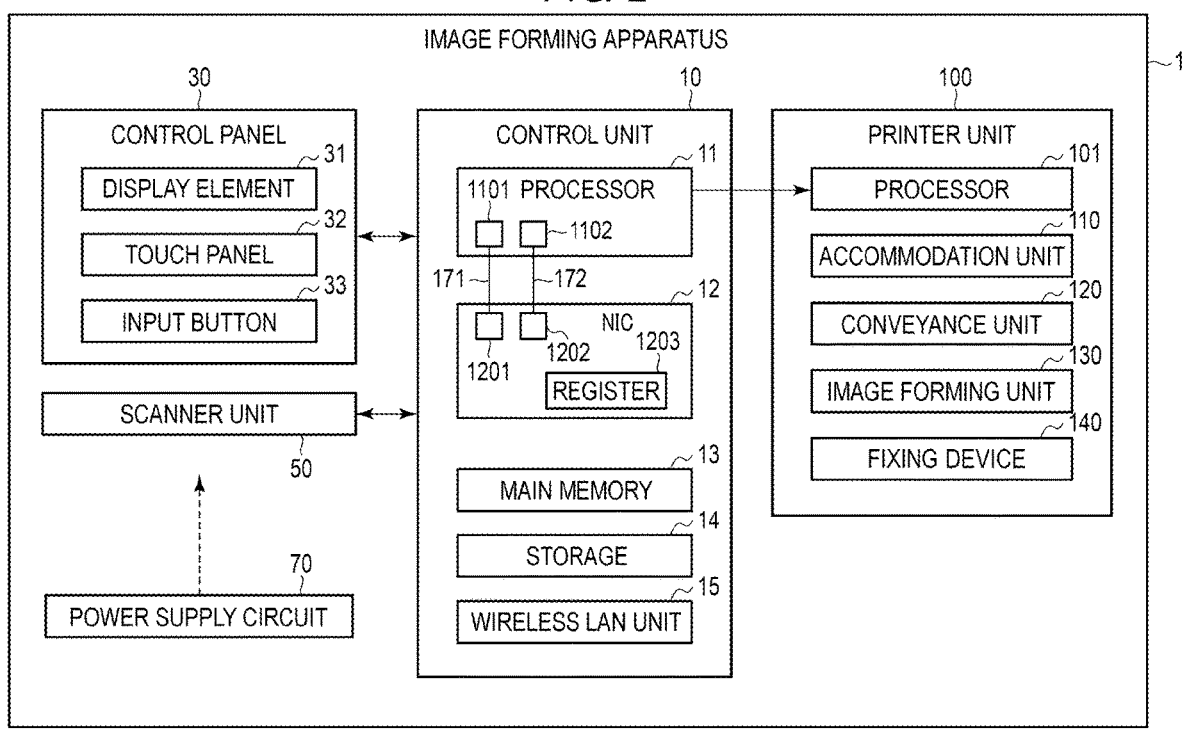
FIG. 2 is a block diagram showing an outline of a configuration example of an image forming apparatus according to an embodiment.

A configuration example of the image forming apparatus 1 will be described. FIG. 2 is a block diagram showing an outline of a configuration example of the image forming apparatus 1. As shown in FIG. 2, the image forming apparatus 1 includes a control unit 10 (a controller), a control panel 30 (a user interface), a scanner unit 50 (a scanner), a power supply circuit 70, and a printer unit 100 (a printer).

The control unit 10 controls the operation of each part of the image forming apparatus 1. The control unit 10 includes a processor 11, a NIC 12, a main memory 13, a storage 14, and a wireless LAN unit 15.

The processor 11 corresponds to the central portion of the image forming apparatus 1. For example, the processor 11 is a CPU but is not limited thereto. The processor 11 may be composed of various circuits. The processor 11 loads the program stored in advance in the main memory 13 or the storage 14 into the main memory 13. The processor 11 executes various operations by executing a program loaded in the main memory 13.

The processor 11 includes a plurality of General Purpose Input/Output (GPIOs) associated with respective processes in the image forming apparatus 1. The GPIO may also be referred to as a GPIO port. The plurality of GPIOs include a print request wake-up GPIO 1101. The print request wake-up GPIO 1101 is associated with processing in the image forming apparatus 1 that requires a power supply to the printer unit 100. Here, printing will be described as an example of the processing in the image forming apparatus 1 that requires a power supply to the printer unit 100. Printing is a process using the printer unit 100. A signal for starting the processor 11 transmitted by the NIC 12 is input to the print request wake-up GPIO 1101 with printing as a wake-up factor. Waking up corresponds to the start.

The plurality of GPIOs include a network wake-up GPIO 1102. The network wake-up GPIO 1102 is associated with processing in the image forming apparatus 1 that does not require a power supply to the printer unit 100. Here, a file transfer will be described as an example of the processing in the image forming apparatus 1 that does not require a power supply to the printer unit 100. The file transfer is a process that can be completed by the control unit 10 that controls the network between the control unit 10 and the terminal 2. The file transfer does not require the printer unit 100. A signal for starting the processor 11 transmitted by the NIC 12 is input to the network wake-up GPIO 1102 with a file transfer as a wake-up factor.

The processor 11 may include three or more GPIOs associated with different processes in the image forming apparatus 1.

The NIC 12 communicates with the terminal 2 connected by wire. The NIC 12 is a module having a processor. For example, the processor is a CPU but is not limited thereto. The processor may be composed of various circuits.

The NIC 12 includes a plurality of GPIOs associated with respective processes in the image forming apparatus 1. The plurality of GPIOs include a print request wake-up GPIO 1201. The print request wake-up GPIO 1201 is associated with printing, like the print request wake-up GPIO 1101. The print request wake-up GPIO 1201 outputs a signal for starting the processor 11 with printing as a wake-up factor.

The plurality of GPIOs include a network wake-up GPIO 1202. The network wake-up GPIO 1202 is associated with a file transfer, like the network wake-up GPIO 1102. The network wake-up GPIO 1202 outputs a signal for starting the processor 11 with a file transfer as a wake-up factor.

The NIC 12 may include three or more GPIOs associated with different processes in the image forming apparatus 1.

The NIC 12 includes a register 1203. The register 1203 is a storage circuit.

The main memory 13 corresponds to the main memory portion of the image forming apparatus 1. The main memory 13 includes a non-volatile memory area and a volatile memory area. The main memory 13 stores an operating system or a program in a non-volatile memory area. The main memory 13 uses the volatile memory area as a work area where data is appropriately rewritten by the processor 11. For example, the main memory 13 includes a Read Only Memory (ROM) as a non-volatile memory area. For example, the main memory 13 includes a Random Access Memory (RAM) as a volatile memory area.

The storage 14 corresponds to the auxiliary storage portion of the image forming apparatus 1. For example, the storage 14 includes a hard disk drive (HDD). The storage 14 may include a semiconductor storage medium such as a Solid State Drive (SSD) in addition to or instead of the HDD. The storage 14 stores the above-mentioned program, data used by the processor 11 for performing various processes, and data generated by the processes in the processor 11. The storage 14 is an example of a storage unit.

The wireless LAN unit 15 communicates with the wirelessly connected terminal 2. The wireless LAN unit 15 is configured in the same manner as the NIC.

The control unit 10 includes a plurality of signal lines provided between the NIC 12 and the processor 11. The signal line corresponds to the bus. The plurality of signal lines are associated with respective processes in the image forming apparatus 1. The plurality of signal lines connect the plurality of GPIOs included in the processor 11 and the plurality of GPIOs included in the NIC 12. The processor 11 communicates with the NIC 12 via the plurality of signal lines.

The plurality of signal lines include a print request wake-up signal line 171. The print request wake-up signal line 171 is associated with processing in the image forming apparatus 1 that requires a power supply to the printer unit 100. The print request wake-up signal line 171 connects the print request wake-up GPIO 1101 included in the processor 11 and the print request wake-up GPIO 1201 included in the NIC 12. The print request wake-up signal line 171 transmits a signal for starting the processor 11 from the print request wake-up GPIO 1201 to the print request wake-up GPIO 1101 with printing as a wake-up factor.

The plurality of signal lines include a network wake-up signal line 172. The network wake-up signal line 172 is associated with processing in the image forming apparatus 1 that does not require a power supply to the printer unit 100. The network wake-up signal line 172 connects the network wake-up GPIO 1102 included in the processor 11 and the network wake-up GPIO 1202 included in the NIC 12. The network wake-up signal line 172 transmits a signal for starting the processor 11 from the network wake-up GPIO 1202 to the network wake-up GPIO 1102 with a file transfer as a wake-up factor.

The control unit 10 may include three or more signal lines associated with different processes in the image forming apparatus 1.

The control panel 30 may include a display element 31 (a display), a touch panel 32, and an input button 33. The display element 31 is a display element such as a liquid crystal display or an organic electroluminescence (EL) display. The display element 31 displays information such as the state of the image forming apparatus 1 and various settings. Further, the display element 31 displays options for changing the settings of the image forming apparatus 1 and the like. The touch panel 32 is provided on the display element 31. The touch panel 32 forms a touch screen together with the display element 31. The touch panel 32 acquires a user's instruction. The input button 33 includes, for example, a printing start button. The input button 33 acquires a user's instruction.

The scanner unit 50 reads images such as characters, figures, and photographs drawn on a medium placed at a predetermined position. Therefore, the scanner unit 50 includes a line sensor. As the line sensor, a Charge Coupled Device (CCD) method may be adopted, a Contact Image Sensor (CIS) method may be adopted, or another method may be adopted. The line sensor is an example of an image element. The scanner unit 50 generates image data based on the image read by using the line sensor. The scanner unit 50 transmits the generated image data to the control unit 10. The control unit 10 stores the received image data in the storage 14 or transmits the received image data to the printer unit 100.

The power supply circuit 70 converts AC power supplied from a commercial power source into DC power and supplies power to the control unit 10, the control panel 30, the scanner unit 50, and the printer unit 100. The power supply circuit 70 can be controlled by the processor 11, the NIC 12, and a processor 101.

The printer unit 100 forms an image on the medium. For example, the printer unit 100 forms an image on the surface of the medium based on the image data transmitted from the terminal 2 via the network.

Here, an example of the printer unit 100 using a tandem type toner image transfer unit will be described. The printer unit 100 includes the processor 101, an accommodation unit 110, a conveyance unit 120, an image forming unit 130, and a fixing device 140.

The processor 101 communicates with the processor 11 by a Universal Asynchronous Receiver/Transmitter (UART). The processor 101 controls the printer unit 100. For example, the processor 101 is a CPU but is not limited thereto. The processor 101 may be composed of various circuits. The accommodation unit 110 accommodates a medium such as paper, cloth, or plastic film. The medium is sequentially conveyed from the accommodation unit 110 to the image forming unit 130 and then the fixing device 140 by the conveyance unit 120. The image forming unit 130 forms an image such as characters, figures, and photographs on the medium. The fixing device 140 fixes the toner image transferred to the medium by heat and pressure. A configuration example of the fixing device 140 will be described later.

Figure 3:
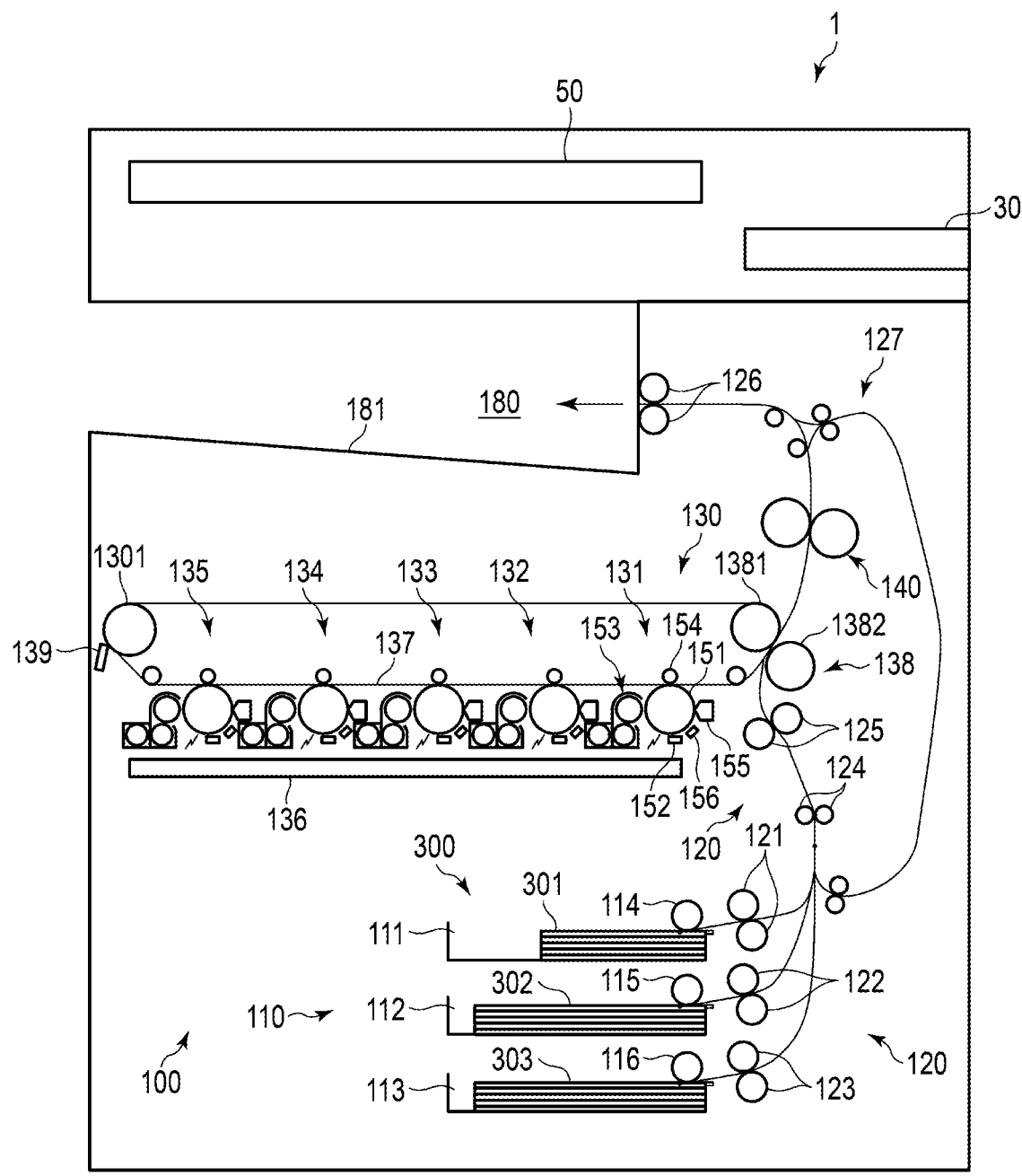
FIG. 3 is a diagram showing an outline of a configuration example of a printer unit.

FIG. 3 is a diagram showing an outline of a configuration example of the printer unit 100. The printer unit 100 will be described with reference to FIG. 3.

The accommodation unit 110 includes a plurality of paper feed cassettes. In the example shown in FIG. 3, the accommodation unit 110 includes a first paper cassette 111, a second paper cassette 112, and a third paper cassette 113. Each paper cassette stores a medium 300 of a predetermined size and type. That is, the first paper cassette 111 accommodates first media 301. The second paper cassette 112 accommodates second media 302. The third paper cassette 113 accommodates third media 303. Here, an example of three paper cassettes is shown, but the number of paper cassettes may be one or any number.

Each paper cassette includes a pickup roller. That is, the first paper cassette 111 includes a first pickup roller 114. The second paper cassette 112 includes a second pickup roller 115. The third paper cassette 113 includes a third pickup roller 116. Each pickup roller picks up a medium 300 from each paper cassette one by one. Each pickup roller supplies the picked-up medium 300 to the conveyance unit 120.

The conveyance unit 120 (a conveyor assembly, a conveyor) conveys the medium 300 in the printer unit 100. The conveyance unit 120 includes conveyance rollers 121 to 124, a registration roller 125, and a conveyance roller 126. The conveyance roller 121 conveys the first medium 301 supplied by the first pickup roller 114 to the conveyance roller 124. The conveyance roller 122 conveys the second medium 302 supplied by the second pickup roller 115 to the conveyance roller 124. The conveyance roller 123 conveys the third medium 303 supplied by the third pickup roller 116 to the conveyance roller 124. The conveyance roller 124 further conveys the medium 300 to the registration roller 125. The registration roller 125 conveys the medium 300 to a transfer unit 138 according to the timing at which the transfer unit 138 of the image forming unit 130, which will be described later, transfers the toner image to the medium 300. The conveyance roller 126 is provided on the downstream side of the fixing device 140 and discharges the medium 300 to a paper discharge unit 180. The paper discharge unit 180 may be an opening having a paper receiving surface 181, or a tray. The conveyance unit 120 may include an inverting unit 127 that inverts the medium 300 when forming an image on both sides of the medium 300.

The image forming unit 130 forms a toner image on the medium 300. The image forming unit 130 includes a plurality of developing units 131 to 135, an exposure device 136, an intermediate transfer belt 137, the transfer unit 138, and a transfer belt cleaner 139. The plurality of developing units 131 to 135 correspond to the number of types of toner.

The image forming unit 130 is configured to perform monochrome printing (black and white) and color printing of non-decolorable printing, and monochromatic decolorable printing. The image forming unit 130 includes a black developing unit 131, a cyan developing unit 132, a magenta developing unit 133, a yellow developing unit 134, and a decolorable developing unit 135. The black developing unit 131 is a developing unit corresponding to the black (K) toner. The cyan developing unit 132 is a developing unit corresponding to the cyan (C) toner. The magenta developing unit 133 is a developing unit corresponding to the magenta (M) toner. The yellow developing unit 134 is a developing unit corresponding to the yellow (Y) toner. The decolorable developing unit 135 is a developing unit corresponding to the decolorable toner. Each developing unit has the same configuration.

Each developing unit includes a photoconductor drum 151 that functions as an image carrier. Each developing unit includes a charger 152, a developing device 153, a primary transfer roller 154, a cleaning unit 155, and a static eliminator 156, around the photoconductor drum 151.

The intermediate transfer belt 137 is an endless belt. The intermediate transfer belt 137 is passed between the photoconductor drum 151 and the primary transfer roller 154 of each developing unit. Further, the intermediate transfer belt 137 is hung on a support roller 1381 of the transfer unit 138 and a support roller 1301. The intermediate transfer belt 137 rotates counterclockwise in FIG. 3.

The photoconductor drum 151 has a photoconductor layer on its surface. The photoconductor drum 151 rotates about an axis clockwise in FIG. 3. The charger 152 uniformly charges the photoconductor layer on the surface of the photoconductor drum 151. For example, the charger 152 charges the surface of the photoconductor drum 151 negatively.

The exposure device 136 is located at a position facing the photoconductor drum 151 of each developing unit. The exposure device 136 includes a semiconductor laser light source. The exposure device 136 irradiates the surface of the photoconductor drum 151 of each developing unit with laser light via an optical system such as a polygon mirror. Under the control of the control unit 10, the exposure device 136 executes an operation including light emission based on the image data. The exposure device 136 forms an electrostatic pattern as an electrostatic latent image at a position irradiated with a laser beam on the surface of the photoconductor drum 151. The exposure device 136 may use a Light Emitting Diode (LED) instead of the laser light source.

The developing device 153 develops an electrostatic latent image on the surface of the photoconductor drum 151 with toner. That is, the toner adheres to the electrostatic latent image of the photoconductor drum 151. As a result, the developing device 153 forms a toner image on the surface of the photoconductor drum 151.

The primary transfer roller 154 faces the photoconductor drum 151 and sandwiches the intermediate transfer belt 137. The primary transfer roller 154 functions as a bias roller. The primary transfer roller 154 transfers the toner image on the surface of the photoconductor drum 151 onto the intermediate transfer belt 137. This transfer is called primary transfer. The black developing unit 131, the cyan developing unit 132, the magenta developing unit 133, and the yellow developing unit 134 can multiplex transfer toner images of each color on the intermediate transfer belt 137.

The cleaning unit 155 is located after the position where the toner image on the surface of the photoconductor drum 151 is transferred onto the intermediate transfer belt 137. The cleaning unit 155 scrapes off untransferred toner and the like on the surface of the photoconductor drum 151. The cleaning unit 155 collects the removed toner in a waste toner tank.

The static eliminator 156 faces the photoconductor drum 151 that has passed through the cleaning unit 155. The static eliminator 156 irradiates the surface of the photoconductor drum 151 with light. The static eliminator 156 removes static electricity from the photoconductor layer by irradiating it with light. The charge of the photoconductor layer becomes uniform.

The transfer unit 138 includes the support roller 1381 and a secondary transfer roller 1382. The support roller 1381 and the secondary transfer roller 1382 are configured to sandwich the intermediate transfer belt 137 and the medium 300 from both sides in the thickness direction. The support roller 1381 is a drive roller for the intermediate transfer belt 137. The secondary transfer roller 1382 faces the support roller 1381 with the intermediate transfer belt 137 interposed therebetween. The transfer unit 138 transfers the charged toner image on the surface of the intermediate transfer belt 137 to the surface of the medium 300. This transfer is called secondary transfer.

The transfer belt cleaner 139 is located between the transfer unit 138 and the developing unit in the moving direction of the intermediate transfer belt 137. The transfer belt cleaner 139 removes the untransferred toner on the surface of the intermediate transfer belt 137 after the toner image is transferred from the intermediate transfer belt 137 to the medium 300.

The fixing device 140 applies heat and pressure to the medium 300 on which the toner image supplied from the image forming unit 130 is formed. The fixing device 140 fixes the toner image formed on the medium 300 by heat and pressure.

Figure 4:
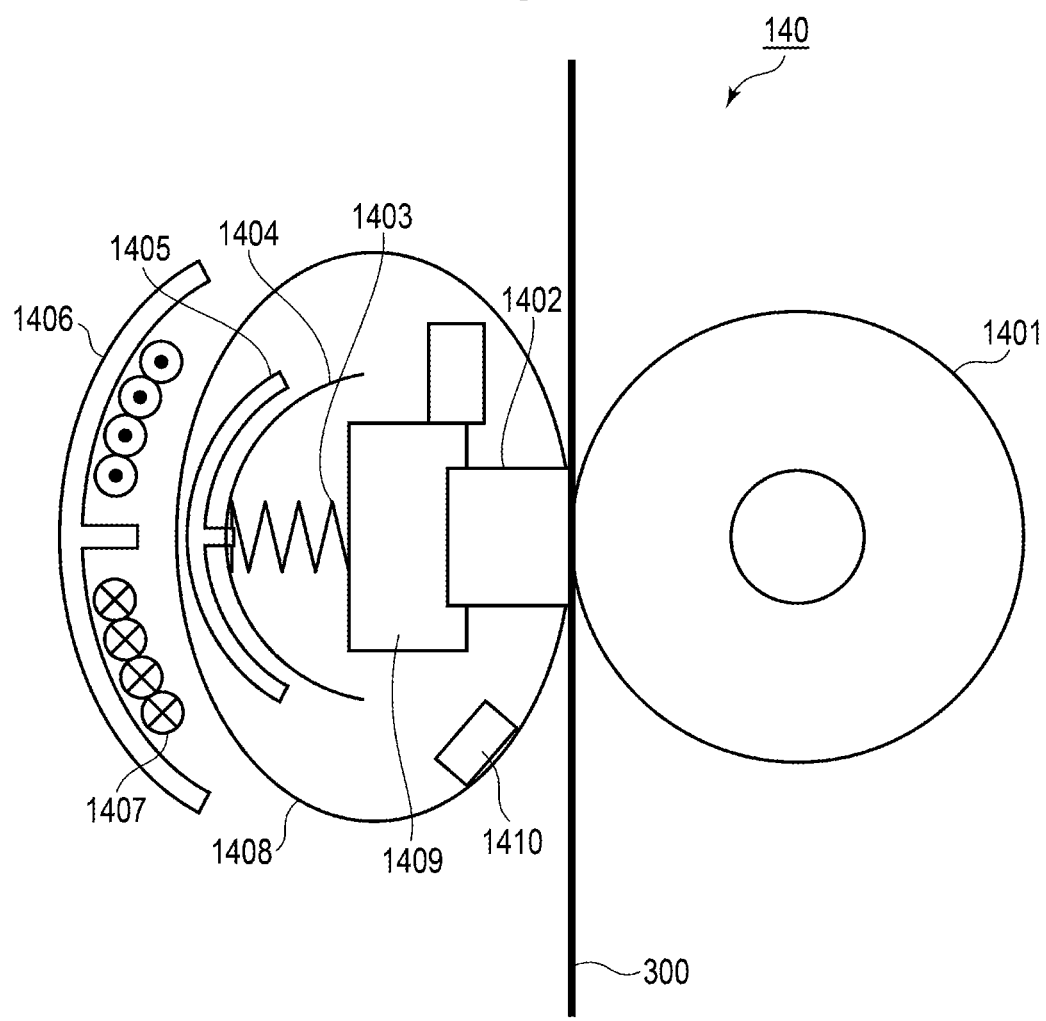
FIG. 4 is a diagram showing an outline of a configuration example of a fixing device.

FIG. 4 is a diagram showing an outline of a configuration example of the fixing device 140. For example, the fixing device 140 is an induction heating type fixing device. The fixing device 140 includes a pressure roller 1401, a pressure pad 1402, a magnetizing alloy position adjustment mechanism 1403, an aluminum member 1404, a magnetizing alloy 1405, a ferrite core 1406, a coil 1407, a fixing belt 1408, a frame 1409, and a sensor 1410.

The pressure roller 1401 is positioned so as to face the fixing belt 1408 on the circumference. The pressure roller 1401 comes into contact with the fixing belt 1408 by the springs at both ends. The pressure roller 1401 has a metal member as a core material and has an elastic layer such as a rubber layer on the outside thereof. The pressure roller 1401 has a release layer on the surface. The pressure roller 1401 is rotationally driven. The pressure roller 1401 may drive the fixing belt 1408. The pressure roller 1401 may have a one-way clutch so as not to cause a speed difference with the fixing belt 1408.

The pressure pad 1402 is located inside the fixing belt 1408. The pressure pad 1402 presses the fixing belt 1408 toward the pressure roller 1401. A nip portion is formed between the fixing belt 1408 and the pressure roller 1401. The shape of the portion of the pressure pad 1402 facing the pressure roller 1401 is the same as the outer peripheral shape of the pressure roller 1401. The width of the pressure pad 1402 in the longitudinal direction is wider than the width of the medium 300 to be conveyed. The pressure pad 1402 has a low friction sheet between the pressure pad 1402 and the pressure roller 1401 in order to improve the slidability.

The magnetizing alloy position adjustment mechanism 1403 is fixed to the frame 1409. The magnetizing alloy position adjustment mechanism 1403 is a position adjustment mechanism of the magnetizing alloy 1405. The aluminum member 1404 is connected to the magnetizing alloy position adjustment mechanism 1403. The aluminum member 1404 shields the magnetic flux generated by the coil 1407. The magnetizing alloy 1405 faces the coil 1407 with the fixing belt 1408 interposed therebetween. When the temperature of the magnetizing alloy 1405 is equal to or higher than the Curie point temperature, the magnetic permeability is lowered and the magnetic flux density transmitted through the fixing belt 1408 is reduced. The ferrite core 1406 is located outside the coil 1407. The ferrite core 1406 shields the magnetic flux generated by the coil 1407. The coil 1407 is located outside the fixing belt 1408. The coil 1407 forms a magnetic flux.

The fixing belt 1408 is an endless belt. The fixing belt 1408 rotates counterclockwise in FIG. 4. The fixing belt 1408 has a plurality of layers. The fixing belt 1408 has a conductive layer that is induced to generate heat by a magnetic field generated by the coil 1407. For example, the conductive layer is made of a conductive material such as iron, nickel, or copper. The fixing belt 1408 may have a copper layer laminated on the Nickel layer. The fixing belt 1408 has an elastic layer on the conductive layer. The fixing belt 1408 has a release layer on the conductive layer. The release layer is a layer that is in direct contact with the toner. As the release layer, a tetrafluoroethylene/perfluoroalkyl vinyl ether copolymer resin (PFA) having good releasability is preferable.

The frame 1409 is located inside the fixing belt 1408. The frame 1409 holds the pressure pad 1402. The sensor 1410 is located inside the fixing belt 1408. The sensor 1410 detects the temperature of the fixing belt 1408. The sensor 1410 is located on the downstream side of the heating portion composed of the magnetizing alloy 1405 and the coil 1407, and on the upstream side of the nip portion formed between the fixing belt 1408 and the pressure roller 1401. The sensor 1410 may be a contact thermistor.

The operation mode of the image forming apparatus 1 configured as described above will be described. The image forming apparatus 1 has at least a power-saving mode and a normal mode. The power-saving mode is a mode in which the power consumed by the image forming apparatus 1 is reduced as compared with the normal mode.

The power-saving mode is a mode in which the power supply from the power supply circuit 70 to the printer unit 100 is stopped, the power supply to a part of the control unit 10 is maintained, and the power supply to the other parts of the control unit 10 is stopped. The power supply may be read as an electric power supply. The reason why the power supply to a part of the control unit 10 is maintained is to maintain the network-related function of the image forming apparatus 1 even in the power-saving mode. For example, a part of the control unit 10 includes the NIC 12 and the wireless LAN unit 15. A part of the control unit 10 may include the main memory 13. A part of the control unit 10 may include a part or all of the processor 11.

In the power-saving mode, the power supply circuit 70 stops the power supply to the printer unit 100. For example, the power supply circuit 70 stops the power supply to the processor 101 in the printer unit 100. As a result, the processor 101 stops operating during the power-saving mode. For example, the power supply circuit 70 stops the power supply to the coil 1407 of the fixing device 140. As a result, the fixing device 140 stops operating during the power-saving mode. The temperature of the fixing device 140 detected by the sensor 1410 drops during the power-saving mode.

In the power-saving mode, the power supply circuit 70 maintains the power supply to a part of the control unit 10. The power supply circuit 70 stops the power supply to other parts of the control unit 10. For example, the power supply circuit 70 supplies power to the NIC 12, the main memory 13, and the wireless LAN unit 15 in the control unit 10. As a result, the NIC 12 and the wireless LAN unit 15 operate during the power-saving mode and can communicate with the terminal 2. The main memory 13 operates during the power-saving mode and stores the work details before the transition to the power-saving mode. The power supply circuit 70 supplies power to at least a part of the processor 11 in the control unit 10. As a result, the processor 11 can receive the signal for starting the processor 11 during the power-saving mode. The processor 11 can be started based on the reception of the signal for starting the processor 11 during the power-saving mode. The processor 11 only needs to be supplied with a minimum amount of power during the power-saving mode so that the processor 11 can be started based on the reception of the signal for starting the processor 11.

The normal mode is a mode in which the power supply from the power supply circuit 70 to the printer unit 100 is maintained and the power supply to the entire control unit 10 is maintained. In the normal mode, the power supply circuit 70 maintains the power supply to the printer unit 100. For example, the power supply circuit 70 supplies power to the processor 101 in the printer unit 100. As a result, the processor 101 operates in the normal mode. For example, the power supply circuit 70 supplies power to the coil 1407 of the fixing device 140. As a result, the fixing device 140 operates during the normal mode.

In the normal mode, the power supply circuit 70 maintains the power supply to the entire control unit 10. For example, the power supply circuit 70 supplies power to the processor 11 in the control unit 10. As a result, the processor 11 operates during the normal mode. For example, the power supply circuit 70 supplies power to the NIC 12 and the wireless LAN unit 15 in the control unit 10. As a result, the NIC 12 and the wireless LAN unit 15 operate during the normal mode.

In the normal mode, there are various states such as a warm-up state and a ready state. The warm-up state is a state in which the processor 101 controls the warm-up with respect to the fixing device 140. The warm-up is a control in which the processor 101 controls the power supply to the coil 1407 in the state where the power supply has been stopped, and stabilizes the temperature of the fixing device 140 at a target temperature. The target temperature is determined according to the fixing temperature for each printing process based on the job related to printing. The warm-up is a control before starting the printing process based on the job related to printing by the printer unit 100. The warm-up requires a large amount of processing time since the temperature of the fixing device 140 needs to be raised to the target temperature. The ready state is a state in which a printing process based on a job related to printing can be executed. The ready state is the state after the warm-up state.

The transition from the power-saving mode to the ready state will be described. The image forming apparatus 1 shifts from the power-saving mode to the warm-up state of the normal mode. After the warm-up is completed, the image forming apparatus 1 shifts from the warm-up state to the ready state. As a result, the image forming apparatus 1 transitions from the power-saving mode to the ready state.

Figure 5:
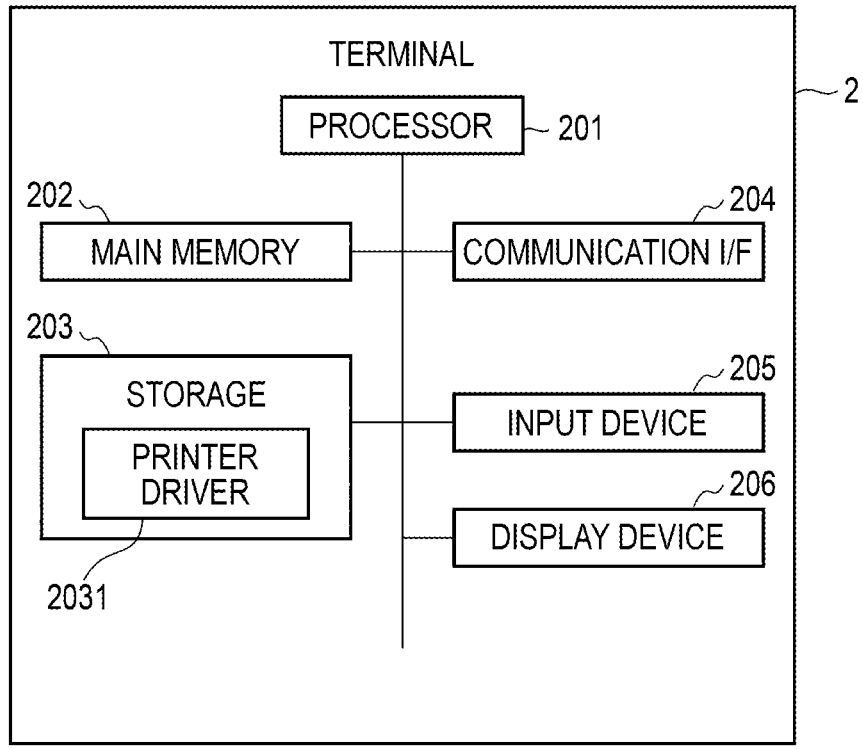
FIG. 5 is a diagram showing an outline of a configuration example of a terminal.

FIG. 5 is a diagram showing an outline of a configuration example of the terminal 2. The terminal 2 is a computer including a processor 201, a main memory 202, a storage 203, a communication interface 204, an input device 205, and a display device 206. Each part constituting the terminal 2 is connected to each other so that signals can be input and output. In FIG. 2, the interface is described as "I/F".

The processor 201 corresponds to the central portion of the terminal 2. For example, the processor 201 is a CPU but is not limited thereto. The processor 201 may be composed of various circuits. The processor 201 loads the program stored in advance in the main memory 202 or the storage 203 into the main memory 202. The processor 201 executes various processes by executing a program loaded in the main memory 202.

The main memory 202 corresponds to the main memory portion of the terminal 2. The main memory 202 includes a non-volatile memory area and a volatile memory area. The main memory 202 stores an operating system or program in a non-volatile memory area. The main memory 202 uses the volatile memory area as a work area where data is appropriately rewritten by the processor 201. For example, the main memory 202 includes a ROM as a non-volatile memory area. For example, the main memory 202 includes a RAM as a volatile memory area. The storage 203 corresponds to the auxiliary storage portion of the terminal 2. For example, the storage 203 includes an HDD. The storage 203 may include a semiconductor storage medium such as an SSD in addition to or instead of the HDD. The storage 203 stores the above-mentioned program, data used by the processor 201 for performing various processes, and data generated by the processes of the processor 201. The storage 203 is an example of a storage unit.

The storage 203 stores a printer driver 2031. The printer driver 2031 is a program that causes the terminal 2 to execute various processes in order to enable printing by the image forming apparatus 1.

The communication interface 204 includes various interfaces for communicably connecting the terminal 2 to other devices by wire or wirelessly according to a predetermined communication protocol.

The input device 205 is a device capable of inputting data or instructions to the terminal 2 by touch operation. For example, the input device 205 is a keyboard, a touch panel, or the like.

The display device 206 is a device capable of displaying an image. For example, the display device 206 is a liquid crystal display or the like.

Figure 6:
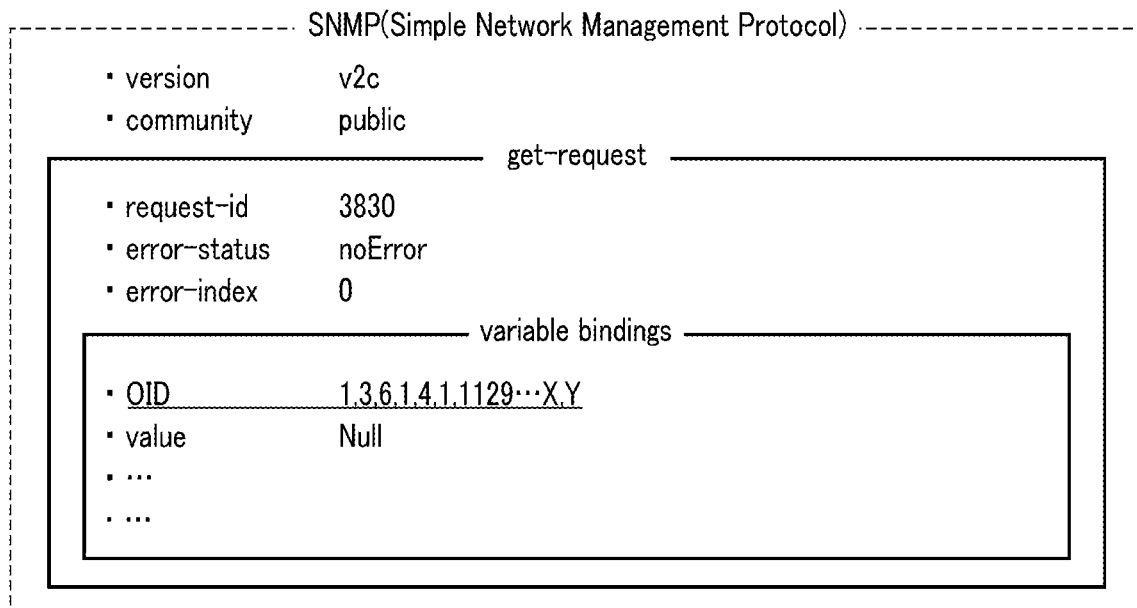
FIG. 6 is a diagram showing an outline of a management information base (MIB).

A management information base (MIB) used for communication between the terminal 2 and the image forming apparatus 1 will be described. FIG. 6 is a diagram showing an outline of the MIB. The MIB is a collection of device information and is exchanged by the Simple Network Management Protocol (SNMP). The SNMP format is the format illustrated in FIG. 6. An Object Identifier (OID) refers to which information in the MIB is exchanged. In addition to the publicly defined OIDs, there are also OIDs that can be defined privately for each company.

"1.3.6.1.4.1.1129 . . . X.Y" shown in FIG. 6 is an OID indicating a print request. The print request is a request for executing a printing process based on a job related to printing from the terminal 2 to the image forming apparatus 1. The OID indicating the print request uses an OID that can be defined privately. Among the OIDs indicating the print request, "1.3.6.1.4.1.1129 . . . X" indicates that the print request is made. "Y" in the OID indicating the print request indicates the index value.

Figures 7, 8:
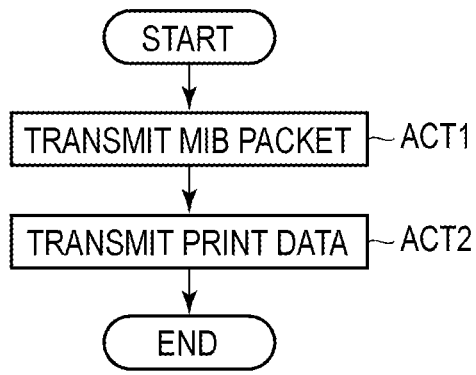
FIG. 7 is a diagram showing an example of an index value.
FIG. 8 is a flowchart illustrating processing by the processor of the terminal.

FIG. 7 is a diagram showing an example of an index value. The index value is a value indicating the printing condition. The printing condition is a printing condition that affects the target temperature of the fixing device 140 in warming up among the print settings set by the user via the input device 205 of the terminal 2.

For example, the printing condition includes one or more of the color mode, the medium type, and the print mode. The color mode is a mode related to printing colors. For example, the color mode indicates either monochrome printing or color printing. Since the fixing temperature differs depending on monochrome printing or color printing, the target temperature of the fixing device 140 in warming up also differs depending on monochrome printing or color printing. The medium type is a type related to the medium on which the image is formed. For example, the medium type indicates any type of plain paper and others (such as plastic film). The medium type is not limited to two stages including plain paper and the other and may be divided into three or more stages. Since the fixing temperature differs depending on the type of medium, the target temperature of the fixing device 140 in warming up also differs depending on the type of medium. The print mode is a mode related to the decolorability of printing. For example, the print mode indicates either non-decolorable printing or decolorable printing. Since the fixing temperature differs depending on the non-decolorable printing or the decolorable printing, the target temperature of the fixing device 140 in warming up also differs depending on the non-decolorable printing or the decolorable printing.

For example, the index value indicates a different value depending on the combination of the color mode, the medium type, and the print mode included in the printing conditions. In the example of FIG. 7, when the color mode is color printing, the medium type is plain paper, and the print mode is non-decolorable printing, the index value is 1. When the medium type is plain paper and the print mode is decolorable printing, the index value is 5. The correspondence between the printing condition and the index value can be set as appropriate.

The index value is an example of print information including printing conditions. At least the index value based on the color mode is an example of print information including the color mode. At least the index value based on the medium type is an example of print information including the medium type. At least the index value based on the print mode is an example of print information including the print mode.

The processing by the processor 201 of the terminal 2 will be described. FIG. 8 is a flowchart illustrating processing by the processor 201 of the terminal 2. The processing procedure described below is merely an example, and each process may be changed as much as possible. Further, with respect to the processing procedure described below, the operation can be omitted, replaced, or added as appropriate according to the embodiment.

The processor 201 executes the process illustrated in FIG. 8 by the printer driver 2031. The user shall perform printing-related input via the input device 205 of the terminal 2. The printing-related input includes the input of specifying the image data to be printed, the input of the print setting, and the input of the instruction to start printing. The print settings include various print-related settings such as color mode, medium type, print mode, number of copies to print, and medium size.

The processor 201 transmits a MIB packet (a request signal) related to a print request to the image forming apparatus 1 (ACT 1). In ACT 1, for example, the processor 201 starts generating a MIB packet related to a print request based on the print start instruction input via the input device 205 of the terminal 2. The MIB packet related to the print request is a MIB packet to specify the OID indicating the print request. The MIB packet related to the print request is an example of a packet related to printing. The processor 201 determines the printing conditions of the combination of the color mode, the medium type, and the print mode based on the printing settings input via the input device 205 of the terminal 2. The processor 201 selects an index value corresponding to the determined printing condition. The processor 201 generates a MIB packet for the print request in which the OID indicating the print request is specified. The OID indicating the print request includes the selected index value. Thus, the MIB packet related to the print request includes the index value. For example, the MIB packet related to the print request includes an index value based on the print mode. For example, the MIB packet related to the print request includes an index value based on at least one of the print mode and the color mode and the medium type.

The processor 201 transmits the generated MIB packet related to the print request to the image forming apparatus 1 separately from the print data before transmitting the print data. The print data is data of a job related to printing requested from the terminal 2 to the image forming apparatus 1. The print data includes print settings input by the user via the input device 205 of the terminal 2. The print data includes image data to be printed specified by the user via the input device 205 of the terminal 2.

Transmitting a MIB packet related to a print request is an example of transmitting print information. For example, the processor 201 transmits a MIB packet related to a print request including an index value based on the print mode to the image forming apparatus 1. Transmitting a MIB packet related to a print request including an index value based on the print mode is an example of transmitting print information including the print mode. The same applies to the color mode and the medium type.

The processor 201 transmits the print data to the image forming apparatus 1 after transmitting the MIB packet related to the print request (ACT 2). In ACT 2, for example, the processor 201 generates print data based on the print settings input via the input device 205 of the terminal 2 and the designated image data to be printed. The processor 201 transmits the generated print data to the image forming apparatus 1. The processor 201 may repeatedly transmit the print data until receiving a response to the transmission of the print data from the image forming apparatus 1.

Figure 9:
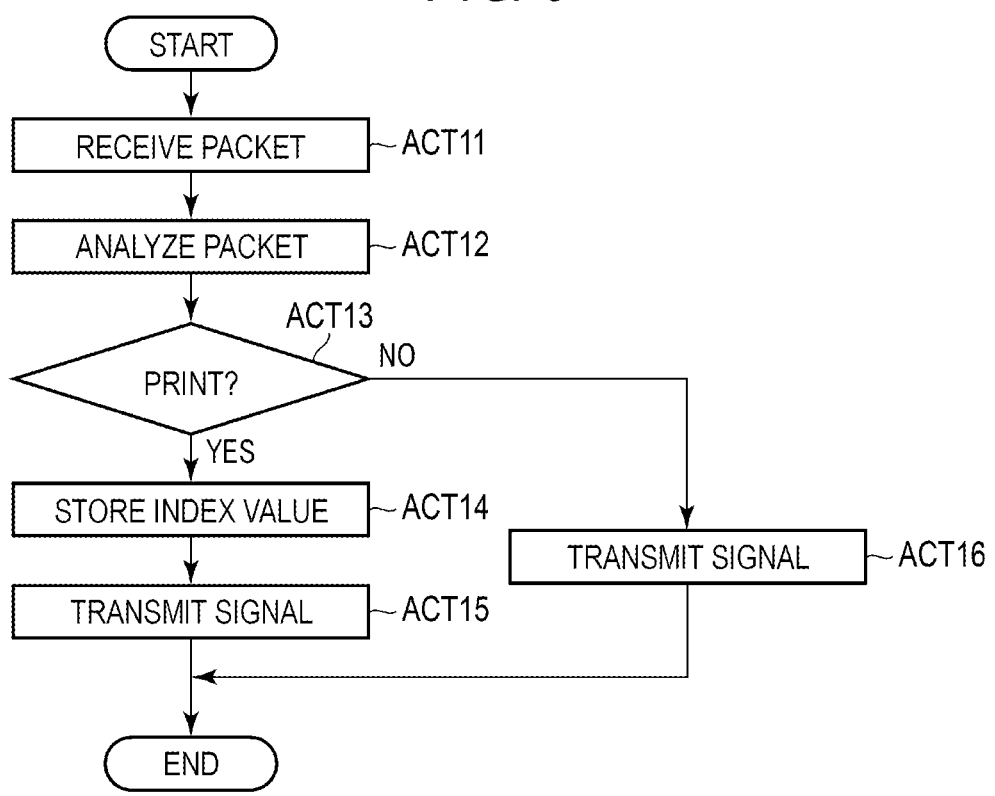
FIG. 9 is a flowchart illustrating processing by a NIC of the image forming apparatus.

The processing by the NIC 12 of the image forming apparatus 1 will be described. FIG. 9 is a flowchart illustrating the processing by the NIC 12 of the image forming apparatus 1. The processing procedure described below is merely an example, and each process may be changed as much as possible. Further, with respect to the processing procedure described below, the operation can be omitted, replaced, or added as appropriate according to the embodiment. It is assumed that the image forming apparatus 1 is in the power-saving mode. The NIC 12 is an example of a first processor or a first control circuit.

The NIC 12 receives a packet related to processing in the image forming apparatus 1 from the terminal 2 during the power-saving mode (ACT 11). Receiving a packet related to processing in the image forming apparatus 1 is an example of receiving information related to processing in the image forming apparatus 1. In ACT 11, for example, the NIC 12 receives the MIB packet related to the print request from the terminal 2 during the power-saving mode. Receiving the MIB packet related to the print request is an example of receiving print information.

The NIC 12 analyzes the received packet (ACT 12). In ACT 12, for example, the NIC 12 analyzes the received packet and determines the processing regarding the received packet in the image forming apparatus 1. When the received MIB packet contains an OID indicating a print request, the NIC 12 determines that the processing in the image forming apparatus 1 is printing. When the received packet is a packet related to file transfer, the NIC 12 determines that the processing in the image forming apparatus 1 is file transfer.

The NIC 12 determines whether or not the processing in the image forming apparatus 1 is printing based on the analysis result (ACT 13). When the processing in the image forming apparatus 1 is printing (ACT 13, YES), the process transitions from ACT 13 to ACT 14. When the processing in the image forming apparatus 1 is not printing (ACT 13, NO), the process transitions from ACT 13 to ACT 16. Here, when the processing in the image forming apparatus 1 is not printing, it is assumed that the processing in the image forming apparatus 1 is file transfer. As will be described later, the NIC 12 transmits a signal based on the received packet via the signal line associated with the processing in the image forming apparatus 1 shown in the received packet among the plurality of signal lines.

The NIC 12 stores the index value included in the MIB packet related to the print request in the register 1203 (ACT 14). The NIC 12 transmits a signal (a print transfer signal, a first signal, a first wake-up signal, etc.) based on the MIB packet related to the print request via the print request wake-up signal line 171 among the plurality of signal lines (ACT 15). In ACT 15, for example, the NIC 12 starts the processor 11 with printing as a wake-up factor by transmitting a signal via the print request wake-up signal line 171. Transmitting a signal via the print request wake-up signal line 171 based on the MIB packet related to the print request is an example of transmitting a signal via the print request wake-up signal line 171 based on the print information. Transmitting a signal via the print request wake-up signal line 171 based on the print information is an example of controlling the start of the processor 11 based on the print information.

The NIC 12 transmits a signal (a file transfer signal, a second signal, a second wake-up signal, etc.) via the network wake-up signal line 172 among the plurality of signal lines based on the packet related to the file transfer (ACT 16). In ACT 16, for example, the NIC 12 starts the processor 11 with the file transfer as a wake-up factor by transmitting a signal via the network wake-up signal line 172.

When the image forming apparatus 1 is in a mode other than the power-saving mode, such as the normal mode, the NIC 12 neglects the MIB packet related to the print request received from the terminal 2.

Figure 10:
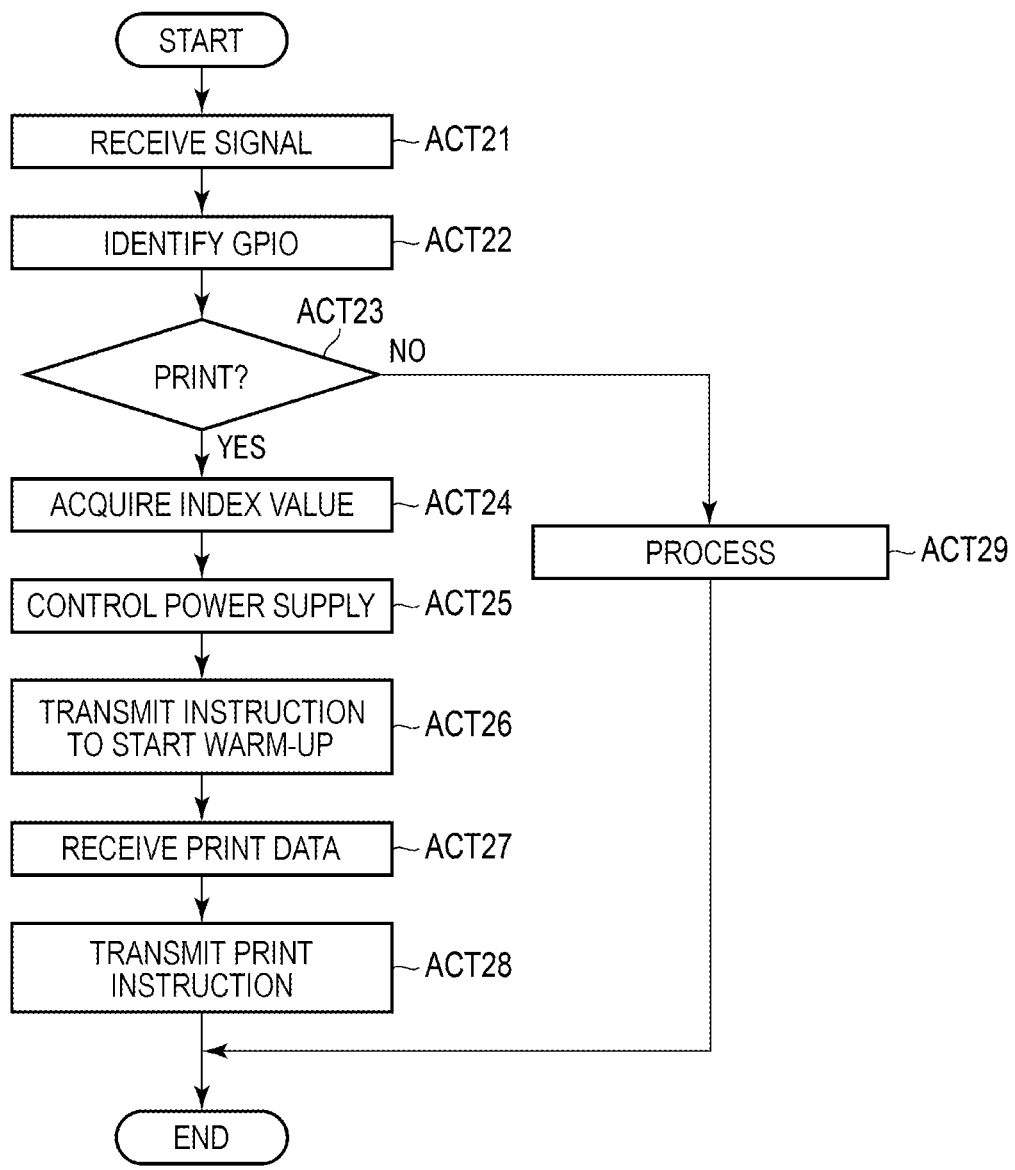
FIG. 10 is a flowchart illustrating processing by the processor of a control unit of the image forming apparatus.

The processing by the processor 11 of the image forming apparatus 1 will be described. FIG. 10 is a flowchart illustrating processing by the processor 11 of the image forming apparatus 1. The processing procedure described below is merely an example, and each process may be changed as much as possible. Further, with respect to the processing procedure described below, the operation can be omitted, replaced, or added as appropriate according to the embodiment. It is assumed that the image forming apparatus 1 is in the power-saving mode. The processor 11 is an example of a second processor or a second control circuit.

The processor 11 receives a signal transmitted from the NIC 12 via any one of a plurality of signal lines during the power-saving mode (ACT 21). For example, in ACT 21, the processor 11 is started based on the reception of the signal transmitted via any of a plurality of signal lines. The processor 11 controls the power supply to the entire processor 11 by the start based on the reception of the signal from the NIC 12. The processor 11 transitions to a state in which each part of the image forming apparatus 1 can be controlled based on the power supply to the entire processor 11 by the power supply circuit 70. Being based on the start includes being based on the power supply to the entire processor 11 by starting. As will be described later, the processor 11 controls the processing in the image forming apparatus 1 associated with the signal line, which has transmitted the signal from the NIC 12, based on the start. In one example, the processor 11 is started based on the reception of the signal transmitted from the NIC 12 via the print request wake-up signal line 171. In this example, the processor 11 performs printing-related control based on the start, as described with reference to ACTS 24 to 28. In another example, the processor 11 is started based on the reception of a signal transmitted from the NIC 12 via the network wake-up signal line 172. In this example, the processor 11 performs file-transfer-related control based on the start, as described with reference to ACT 29.

The processor 11 identifies the GPIO input by the signal based on the reception of the signal from the NIC 12 (ACT 22). In ACT 22, for example, the processor 11 identifies the GPIO to which the signal from the NIC 12 is input among the print request wake-up GPIO 1101 and the network wake-up GPIO 1102. Identifying the GPIO to which the signal from the NIC 12 is input corresponds to identifying the signal line that has transmitted the signal from the NIC 12. The processor 11 determines the processing in the image forming apparatus 1 that causes the wake-up based on the identification of the GPIO to which the signal from the NIC 12 is input. In one example, the processor 11 determines that the wake-up factor is printing based on the signal from the NIC 12 input to the print request wake-up GPIO 1101. In another example, the processor 11 determines that the wake-up factor is file transfer based on the signal from the NIC 12 input to the network wake-up GPIO 1102. As a result, the processor 11 can determine the wake-up factor based on the signal from the NIC 12 without requiring the analysis of the packet.

The processor 11 determines whether or not the wake-up factor is printing (ACT 23). When the wake-up factor is printing (ACT 23, YES), the process transitions from ACT 23 to ACT 24. If the wake-up factor is not printing (ACT 23, NO), the process transitions from ACT 23 to ACT 29. Here, when the wake-up factor is not printing, it is assumed that the wake-up factor is file transfer.

The processor 11 acquires the index value stored in the register 1203 from the NIC 12 (ACT 24). In ACT 24, for example, the processor 11 acquires the index value from the NIC 12 by reading the register 1203.

The processor 11 controls the power supply to the printer unit 100 (ACT 25). In ACT 25, for example, the processor 11 controls the power supply to each part of the printer unit 100 such as the processor 101 based on the start by the NIC 12. The printer unit 100 starts up based on the start of the power supply.

The processor 11 transmits a warm-up start instruction for the printer unit 100 based on the index value acquired from the NIC 12 to the processor 101 (ACT 26). In ACT 26, for example, the processor 11 generates a warm-up start instruction based on the index value acquired from the NIC 12. The warm-up start instruction is an instruction to cause the processor 101 to control the start of warm-up based on the printing conditions. The warm-up start instruction includes information on printing conditions corresponding to the index value. For example, when the index value is 1, the warm-up start instruction includes information on printing conditions including color printing, plain paper, and non-decolorable printing corresponding to the index value "1". The processor 11 can add the information of the printing condition corresponding to the index value to the format of the warm-up start instruction packet as a parameter. The processor 11 transmits the warm-up start instruction to the processor 101 after communication with the processor 101 becomes possible. The processor 11 can shift the operation mode of the image forming apparatus 1 from the power-saving mode to the warm-up state of the normal mode by transmitting the warm-up start instruction.

The processor 11 receives print data from the terminal 2 (ACT 27). The processor 11 transmits a print instruction based on the print data to the processor 101 (ACT 28). In ACT 28, for example, the processor 11 transmits a print instruction based on the print data to the processor 101 after shifting from the warm-up state of the normal mode to the ready state. The print instruction may include information necessary for a printing process based on the job related to printing by the printer unit 100, such as print settings and image data.

When the wake-up factor is file transfer, the processor 11 controls the file transfer process (ACT 29). In ACT 29, for example, the processor 11 controls the file transfer process without controlling the start of the power supply to the printer unit 100.

Figure 11:
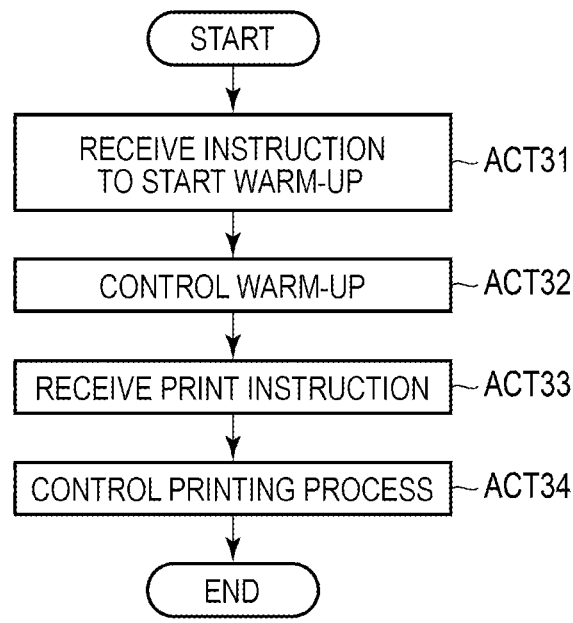
FIG. 11 is a flowchart illustrating processing by the processor of the printer unit of the image forming apparatus.

The processing by the processor 101 of the image forming apparatus 1 will be described. FIG. 11 is a flowchart illustrating processing by the processor 101 of the image forming apparatus 1. The processing procedure described below is merely an example, and each process may be changed as much as possible. Further, with respect to the processing procedure described below, the operation can be omitted, replaced, or added as appropriate according to the embodiment. It is assumed that the printer unit 100 is started by the control of the power supply by the processor 11. The processor 101 is an example of a third processor or a third control circuit.

The processor 101 receives a warm-up start instruction from the processor 11 (ACT 31). The processor 101 controls the warm-up based on the warm-up start instruction (ACT 32). In ACT 32, for example, the processor 101 sets a target temperature according to the printing condition based on the information of the printing condition included in the warm-up start instruction. The processor 101 controls the power supply to the coil 1407 so that the temperature of the fixing device 140 becomes a target temperature according to the printing condition. The image forming apparatus 1 shifts from the warm-up state to the ready state based on the completion of the warm-up.

The processor 101 receives a print instruction from the processor 11 (ACT 33). The processor 101 controls the printing process based on the job related to printing based on the printing instruction (ACT 34). In ACT 34, for example, the processor 101 controls each part of the printer unit 100 and controls the printing process according to the color mode, the medium type, and the print mode indicated by the printing condition.

According to the present embodiment, in the first control circuit, the image forming apparatus 1 can control the start of the second control circuit based on the print information received from the terminal 2 during the power-saving mode. In the second control circuit, the image forming apparatus 1 can control the power supply to the third control circuit based on the start by the first control circuit and can transmit a warm-up start instruction based on the print information to the third control circuit. Thereby, for example, the image forming apparatus 1 can set a target temperature of the fixing device 140 based on the print information. By setting the target temperature of the fixing device 140 based on the print information, the image forming apparatus 1 can start a warm-up operation suitable for the printing process before receiving the print data. The image forming apparatus 1 can shorten the time required to transit from the warm-up state to the ready state after the start of the warm-up by executing the warm-up operation suitable for the printing process. Therefore, the image forming apparatus 1 can shorten the time required to return from the power-saving mode to the printable ready state.

The terminal 2 can transmit the print information to the image forming device 1 before transmitting the print data. As a result, the terminal 2 can support the reduction of the time required for the image forming apparatus 1 to return from the power-saving mode to the printable ready state.

The print information can include a print mode indicating either non-decolorable printing or decolorable printing. As mentioned above, the fixing temperature varies depending on the non-decolorable printing or the decolorable printing. Thereby, for example, the image forming apparatus 1 can set the target temperature of the fixing device 140 based on the print mode by receiving the printing information including the print mode. The image forming apparatus 1 can execute a warm-up operation suitable for the printing process by setting the target temperature of the fixing device 140 based on the print mode. Therefore, the image forming apparatus 1 can shorten the time required to return from the power-saving mode to the printable ready state. The terminal 2 can support the reduction of the time required for the image forming apparatus 1 to return from the power-saving mode to the printable ready state by transmitting the print information including the print mode.

In the first control circuit, the image forming apparatus 1 can transmit a signal via a signal line associated with printing among a plurality of signal lines based on print information. In the second control circuit, the image forming apparatus 1 can be started based on the reception of the signal transmitted via the signal line associated with printing and can perform printing-related control based on the start. Thereby, for example, the image forming apparatus 1 can determine the wake-up factor in the second control circuit based on the signal from the first control circuit. In the second control circuit, the image forming apparatus 1 can immediately control the processing in the image forming apparatus 1 corresponding to the wake-up factor based on the start. For example, the image forming apparatus 1 can immediately perform printing-related control in the second control circuit based on the start. Therefore, the image forming apparatus 1 can shorten the time required to return from the power-saving mode to the printable ready state.

In the above example, the NIC 12 has been illustrated as an example, but the wireless LAN unit 15 can also operate in the same manner as the NIC 12. In this example, the wireless LAN unit 15 is an example of the first processor or the first control circuit.

The transfer of a device is generally performed with the program stored in the main memory or storage. However, the embodiment is not limited thereto, and the transfer may be performed in a state that the program is not stored in the main memory or storage. Then, in this case, the program transferred separately from the device is written to the writable storage device provided in the device according to the operation of the user or the like. The program can be transferred by recording the program on a removable recording medium or by communicating via a network. The recording medium may be in any form as long as it can store a program and can be read by the device, such as a CD-ROM or a memory card. Further, the function obtained by installing or downloading the program may be one that realizes the function in cooperation with the operating system (OS) inside the device.

While certain embodiments have been described, these embodiments have been presented by way of example only, and are not intended to limit the scope of the disclosure. Indeed, the novel apparatus and methods described herein may be embodied in a variety of other forms; furthermore, various omissions, substitutions and changes in the form of the apparatus and methods described herein may be made without departing from the spirit of the disclosure. The accompanying claims and their equivalents are intended to cover such forms or modifications as would fall within the scope and spirit of the disclosure.

What is claimed is:

1. An image forming apparatus comprising:
    a first control circuit configured to communicate with an information processing device;
    a second control circuit configured to communicate with the first control circuit; and
    a third control circuit configured to communicate with the second control circuit and control a printer, the first control circuit being configured to:
        receive print information from the information processing device during a power-saving mode; and
        control a start of the second control circuit based on the print information; and
    the second control circuit being configured to:
        control a power supply to the third control circuit based on the start by the first control circuit; and
        transmit a warm-up start instruction for the printer to the third control circuit based on the print information acquired from the first control circuit after communication with the third control circuit becomes possible.

2. The image forming apparatus of claim 1, further comprising a plurality of signal lines connecting the first control circuit and the second control circuit, wherein each of the plurality of signal lines is associated with a different type of processing in the image forming apparatus, and wherein the first control circuit is configured to transmit a print signal via a first signal line of the plurality of signal lines associated with printing based on the print information.

3. The image forming apparatus of claim 1, wherein the print information includes a print mode indicating either non-decolorable printing or decolorable printing.

4. An image forming apparatus operable in a power-saving mode, the image forming apparatus comprising:
    a first control circuit configured to communicate with an information processing device;
    a second control circuit;
    a first signal line connecting the first control circuit and the second control circuit; and
    a second signal line connecting the first control circuit and the second control circuit;
    the first control circuit being configured to:
        receive a request signal from the information processing device during the power-saving mode;
        determine whether the request signal includes information regarding a first type of request or a second type of request, the first type of request including a print request;
        transmit a first signal to the second control circuit via the first signal line in response to the request signal including the first type of request; and
        transmit a second signal to the second control circuit via the second signal line in response to the request signal including the second type of request; and
    the second control circuit being configured to:
        start in response to receiving the first signal or the second signal; and
        perform printing-related control based on the start and in response to receiving the first signal.

5. The image forming apparatus of claim 4, wherein the first control circuit is or includes a network interface card.

6. The image forming apparatus of claim 4, wherein the first control circuit is or includes a wireless local area network unit.

7. The image forming apparatus of claim 4, wherein the second control circuit is only provided enough power during the power-saving mode so that the second control circuit can receive the first signal or the second signal from the first control circuit and start.

8. The image forming apparatus of claim 4, wherein, when performing the printing-related control, the second control circuit is configured to provide power to a printer and transmit a warm-up instruction to the printer.

9. The image forming apparatus of claim 8, further comprising the printer, wherein the printer includes a third control circuit, and wherein the third control circuit is configured to control warm-up of the printer based on the warm-up instruction received from the second control circuit.

10. The image forming apparatus of claim 9, wherein the first control circuit is configured to acquire an index value from the information in response to the request signal including the first type of request.

11. The image forming apparatus of claim 10, wherein the first control circuit is configured to store the index value.

12. The image forming apparatus of claim 11, wherein the second control circuit is configured to acquire the index value from the first control circuit in response to receiving the first signal.

13. The image forming apparatus of claim 12, wherein the warm-up instruction is based on the index value.

14. The image forming apparatus of claim 8, wherein the second control circuit is configured to not provide the power to the printer in response to receiving the second signal.

15. The image forming apparatus of claim 14, wherein the second type of request is a file transfer request, and wherein the second control circuit is configured to perform file transfer related control based on the start and in response to receiving the second signal.

16. The image forming apparatus of claim 8, wherein, when performing the printing-related control, the second control circuit is configured to:
   receive print data provided to the image forming apparatus by the information processing device separate from and subsequent to the request signal; and
   transmit a print instruction to the printer to perform a print job based on the print data.

17. A method executable by a computer, the method comprising:
   communicating, via a control circuit, with an image processing device operable in a power-saving mode;
   transmitting print information including a print mode indicating either non-decolorable printing or decolorable printing to the image processing device;
   transmitting a warm-up start instruction to the image processing device based on the print information acquired via the control circuit; and
   transmitting print data to the image processing device during the power-saving mode after the print information is transmitted.

* * * * *